(12) United States Patent
Kihara et al.

(10) Patent No.: US 8,720,376 B2
(45) Date of Patent: May 13, 2014

(54) CORAL CULTIVATION METHOD, MANUFACTURING METHOD FOR CORAL-GROWTH SUBSTRATE PRECIPITATED WITH ELECTRODEPOSITED MINERALS, AND CORAL-GROWTH SUBSTRATE

(75) Inventors: Kazuyoshi Kihara, Hiroshima (JP); Oki Goto, Tokyo (JP); Yasufumi Kondou, Tokyo (JP); Yukio Koibuchi, Tokyo (JP); Makoto Omori, Tokyo (JP)

(73) Assignees: Mitsubishi Heavy Industries Bridge & Steel Structures Engineering Co., Ltd., Hiroshima (JP); The Nippon Corrosion Engineering Co., Ltd., Tokyo (JP); The University Of Tokyo, Tokyo (JP)

( * ) Notice: Subject to any disclaimer, the term of this patent is extended or adjusted under 35 U.S.C. 154(b) by 275 days.

(21) Appl. No.: 13/125,729

(22) PCT Filed: Oct. 23, 2009

(86) PCT No.: PCT/JP2009/068284
§ 371 (c)(1),
(2), (4) Date: Apr. 22, 2011

(87) PCT Pub. No.: WO2010/047394
PCT Pub. Date: Apr. 29, 2010

(65) Prior Publication Data
US 2011/0192352 A1 Aug. 11, 2011

(30) Foreign Application Priority Data
Oct. 23, 2008 (JP) .................. 2008-273469

(51) Int. Cl.
*A01K 61/00* (2006.01)
(52) U.S. Cl.
USPC ....................................... 119/200

(58) Field of Classification Search
USPC .......................... 119/200, 221, 238
See application file for complete search history.

(56) References Cited

FOREIGN PATENT DOCUMENTS

| JP | 11-276013 A | 10/1999 |
|---|---|---|
| JP | 2001321001 | 11/2001 |
| JP | 2007-159525 A | 6/2007 |
| JP | 2007-267699 A | 10/2007 |
| JP | 2008-125440 A | 6/2008 |
| JP | 2008-154471 A | 7/2008 |
| JP | 2009-065971 A | 4/2009 |
| JP | 2009-232706 A | 10/2009 |

OTHER PUBLICATIONS

Japanese Office Action for Application No. 2010-534852 mailed Apr. 24, 2012.

(Continued)

*Primary Examiner* — Monica Williams
(74) *Attorney, Agent, or Firm* — Lowe Hauptman & Ham, LLP

(57) ABSTRACT

A coral cultivation method includes: an electrodeposited-mineral precipitating procedure for precipitating electrodeposited minerals on a coral-growth substrate for growing coral, which is placed in seawater, by applying an electric current between the coral-growth substrate and a first anode that is electrically connected to the coral-growth substrate and placed in the seawater; a coral-larvae growing procedure for growing coral larvae on the coral-growth substrate precipitated with the electrodeposited minerals; a coral-cultivation-structure configuring procedure for configuring a coral cultivation structure from a plurality of the coral-growth substrates on which the coral larvae are grown; and a coral cultivating procedure for cultivating coral by applying an electric current between the coral-growth substrate on which the coral larvae are grown and a second anode.

7 Claims, 11 Drawing Sheets

(56) References Cited

OTHER PUBLICATIONS

Notice of Acceptance issued by the Australian Patent Office on Oct. 16, 2012 in corresponding Australian Application No. 2009307380.
Office Action corresponding to JP 2010-534852, dated Feb. 5, 2013.
Kihara, Kazuyoshi et al, "Introduction to Coral Growth Promotion Technology Using Electrodeposition," Dai 55 Kai Proceedings of the Japan Conference on Materials and Environments, Sep. 5, 2008, pp. 283-286.
Kihara, Kazuyoshi et al, "Coral Growth Promotion Technology Using Electrodeposition," Dai 16 Kai Proceedings of the Symposium of Global Environment, Aug. 30, 2008, pp. 37-72.
Research Institute for Ocean Economics Proposal of "Preservation and Recovery Plan for Okinotori Island Using Electrodeposition Technology," Shadan Hojin Kaiyo Sangyo Kenkyusho, Aug. 22, 2008, pp. 1 to 8.
Decision of Patent Grant mailed Jan. 21, 2014, corresponds to Japanese patent application No. 2010-534852.

CORAL CULTIVATION METHOD, MANUFACTURING METHOD FOR CORAL-GROWTH SUBSTRATE PRECIPITATED WITH ELECTRODEPOSITED MINERALS, AND CORAL-GROWTH SUBSTRATE

RELATED APPLICATIONS

The present application is national phase of PCT/JP2009/068284 filed Oct. 23, 2009, and claims priority from Japanese Application Number 2008-273469, filed Oct. 23, 2008.

FIELD

The present invention relates to artificial coral breeding.

BACKGROUND

In recent years, there has been a problem of destruction of coral reefs such as bleaching of coral communities and extinction of coral due to the rising sea temperature and the like resulting from landfill and the global warming. Therefore, in recent years, attempts of recovering coral reefs by artificially cultivating coral have been proposed. Patent Literature 1 proposes an apparatus that cultivates coral by arranging a cathode to which coral is attached and an anode in sea water and applying an electric current between the cathode and the anode.

CITATION LIST

Patent Literature

Patent Literature 1: Japanese Patent Application Laid-open No. 2007-153525

SUMMARY

Technical Problem

When an electric current is applied between a cathode and an anode in seawater, electrodeposited minerals are precipitated on the cathode. Calcareous algae adhere to the precipitated electrodeposited minerals, and as a result, coral easily grows on the cathode. To efficiently cultivate coral, an environment in which coral is easily cultivated and grown on the cathode needs to be prepared in advance.

The present invention has been achieved to solve the above problems, and an object of the present invention is to provide a coral cultivation method that can efficiently cultivate coral, and to provide a manufacturing method for a coral-growth substrate precipitated with electrodeposited minerals and a coral-growth substrate that can be used for efficient coral cultivation.

Solution to Problem

According to an aspect of the present invention, a coral cultivation method includes: an electrodeposited-mineral precipitating procedure for precipitating electrodeposited minerals on a coral-growth substrate for growing coral, which is placed in seawater, by applying an electric current between the coral-growth substrate and a first anode that is electrically connected, to the coral-growth substrate and placed in the seawater; a coral-larvae growing procedure for growing coral larvae on the coral-growth substrate precipitated with the electrodeposited minerals; and a coral cultivating procedure for cultivating coral by applying an electric current between the coral-growth substrate on which the coral larvae are grown and a second anode.

By precipitating the electrodeposited minerals on the coral-growth substrate before growing the coral larvae, the coral larvae can be easily grown and developed on the coral-growth substrate, thereby enabling to cultivate coral efficiently. Growth of coral larvae means that the coral larvae (planula larvae) adhere to the coral-growth substrate and starts to grow. Further, by configuring a coral cultivation structure from the coral-growth substrate after growing the coral larvae on the coral-growth substrate, the coral larvae can be efficiently grown. As a result, coral can be efficiently cultivated.

Advantageously, in the coral cultivation method, after the coral-larvae growing procedure, a coral-cultivation-structure configuring procedure for configuring a coral cultivation structure from a plurality of the coral-growth substrates on which the coral larvae are grown is performed, and thereafter the coral cultivating procedure is performed. Accordingly, the coral-growth substrate on which the coral larvae are grown can be attached to the coral cultivation structure, to cultivate coral in seawater. If the coral cultivation structure is installed in an ocean area in which it is desired to breed coral artificially, coral can be artificially bred in a desired ocean area.

Advantageously, in the coral cultivation method, in the electrodeposited-mineral precipitating procedure, current density on a surface of the coral-growth substrate is set larger than that at a time of cultivating the coral. According to this configuration, electrodeposited minerals can be precipitated more quickly than at the time of cultivating coral on the coral-growth substrate, without hindering coral cultivation.

Advantageously, in the coral cultivation method, an electrode having a self-potential lower than that of the coral-growth substrate is used as the first anode. According to this configuration, an electric current can be applied between the coral-growth substrate and the first anode in the electrodeposited-mineral precipitating procedure using a so-called galvanic anode method.

Advantageously, in the coral cultivation method, aluminum alloy or magnesium alloy is used as the first anode. According to this configuration, generation of chlorine from the first anode can be prevented in the electrodeposited-raineral precipitating procedure.

Advantageously, in the coral cultivation method, an electrode having a self-potential lower than that of the coral-growth substrate is used as the second anode. According to this configuration, an electric current can be applied, between the coral-growth substrate and the second anode using the galvanic anode method in the coral cultivating procedure.

Advantageously, in the coral cultivation method, aluminum alloy or magnesium alloy is used as the second anode. According to this configuration, generation of chlorine from the second anode can be prevented. Further, when a self-potential of the second anode is lower than that of the coral-growth substrate, current density of the second anode can be easily set to a value appropriate for coral cultivation.

Advantageously, in the coral cultivation method, the first anode is used as the second anode in the coral cultivating procedure. According to this configuration, the coral cultivating procedure can be performed without replacing the first anode.

Advantageously, in the coral cultivation method, the electrodeposited-mineral precipitating procedure includes a stage of applying an electric current by using a power source.

According to this configuration, an electric current can be easily applied between the coral-growth substrate and the first anode.

According to another aspect of the present invention, in a manufacturing method for a coral-growth substrate precipitated with electrodeposited minerals, an electric current is applied between a coral-growth substrate for growing coral, which is placed in seawater, and a first anode that is electrically connected to the coral-growth substrate and placed in the seawater, to precipitate electrodeposited minerals on the coral-growth substrate.

According to this configuration, a coral-growth substrate that enables coral larvae to be grown and developed easily and enables efficient coral cultivation can be manufactured.

Advantageously, in the manufacturing method for a coral-growth substrate precipitated, with electrodeposited minerals, when an electric current is applied between the coral-growth substrate and the first anode, after a predetermined period has passed since start of application of an electric current with first current density, an electric current is applied thereto with second current density that is lower than the first current density. Accordingly, a coral-growth substrate covered with dense and strong electrodeposited minerals can be manufactured. Further, because an electric current is applied between the coral-growth substrate and the first anode with the first current density that is higher than the second current density, the surface of the coral-growth substrate can be covered with electrodeposited minerals in a relatively short period of time. Thereafter, electrodeposited minerals containing calcium carbonate in a large amount can be precipitated by applying an electric current with the second current density. Therefore, a coral-growth substrate covered with dense and strong electrodeposited minerals can be manufactured.

According to still another aspect of the present invention, a coral-growth substrate includes: a metal core material; and an electrodeposited mineral layer including at least a first electrodeposited mineral layer that covers outside of the core material and a second electrodeposited mineral layer that covers outside of the first electrodeposited mineral layer.

Accordingly, because the core material constituting the coral-growth substrate can be covered with dense and strong electrodeposited minerals, the coral larvae can be reliably grown and settled. It is desired that the second electrodeposited mineral layer contains more calcium carbonate than magnesium hydrate, as compared with the first electrodeposited mineral layer. In this manner, it can be considered that, because the second electrodeposited mineral layer for growing coral larvae contains calcium carbonate having a component similar to a coral skeleton in a larger amount, an environment appropriate for coral cultivation can be acquired. Further, because the second electrodeposited mineral layer contains more calcium carbonate, dense and strong electrodeposited mineral layer can be formed. As a result, separation and dropping of the second electrodeposited mineral layer are suppressed, and thus the growing coral larvae can be reliably held and settled.

Advantageous Effects of Invention

The coral cultivation method according to the present invention can prepare an environment suitable for coral cultivation by precipitating electrodeposited minerals on a coral-growth substrate in advance, and can efficiently cultivate coral. Further, the manufacturing method for a coral-growth substrate precipitated with electrodeposited minerals and the coral-growth substrate according to the present invention enable manufacturing of a coral-growth substrate for efficiently cultivating coral.

DESCRIPTION OF EMBODIMENTS

Exemplary embodiments of the present invention will be explained below in detail with reference to the accompanying drawings. The present invention is not limited to the following explanations. In addition, constituent elements in the following explanations include those that can be easily assumed by persons skilled in the art or that are substantially equivalent, which are so-called "equivalents".

Figure 1:
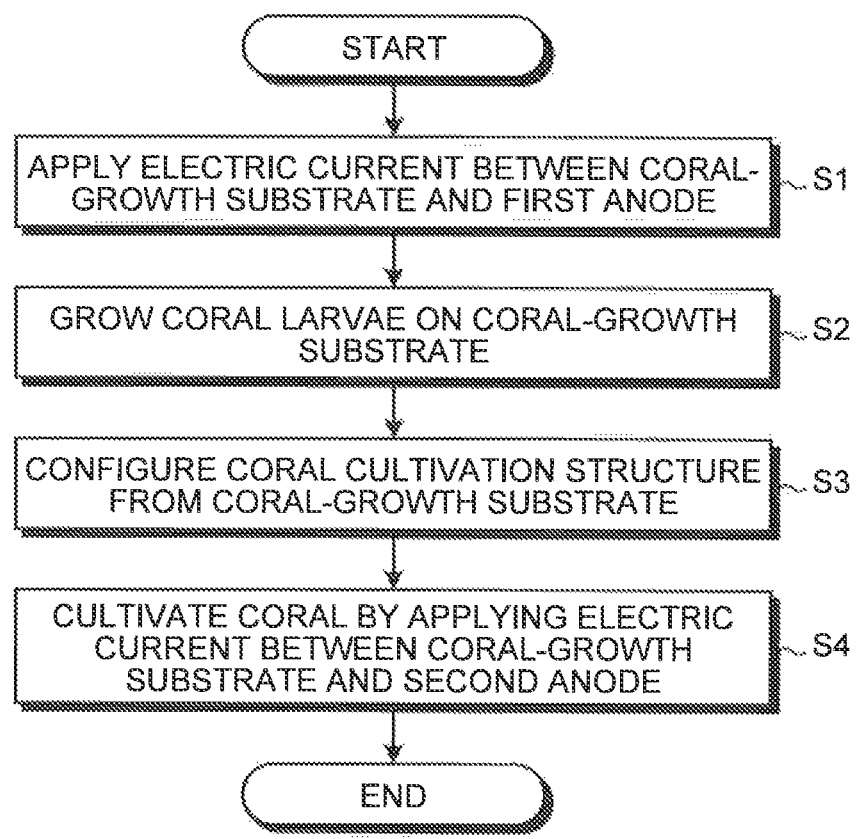
FIG. 1 is a flowchart of an invention according to an embodiment of the present invention.

FIG. 1 is a flowchart of an invention according to an embodiment of the present invention. A coral cultivation method according to the present embodiment includes: an electrodeposited-mineral precipitating procedure S1 for precipitating electrodeposited minerals on a coral-growth substrate for growing coral, which is placed in seawater, by applying an electric current between the coral-growth substrate and a first anode electrically connected to the coral-growth substrate and placed in the seawater; a coral-larvae growing procedure S2 for growing coral larvae on the coral-growth substrate precipitated with the electrodeposited minerals; a coral-cultivation-structure configuring procedure S3 for configuring a coral cultivation structure from a plurality of coral-growth substrates on which the coral larvae are grown; and a coral cultivating procedure S4 for coral cultivation by applying an electric current between the coral-growth substrate on which the coral larvae are grown and a second anode.

In the present embodiment, by precipitating the electrodeposited minerals on the coral-growth substrate to be used for growing coral before growing the coral larvae, the coral larvae can be easily grown and developed on the coral-growth substrate, thereby enabling to cultivate coral efficiently. Further, by configuring the coral cultivation structure from the coral-growth substrates after growing the coral larvae on the coral-growth substrates, the coral larvae can be efficiently grown. The respective procedures are explained below in detail.

[Electrodeposited-Mineral Precipitating Procedure]

The electrodeposited-mineral precipitating procedure S1 is explained first. In the electrodeposited-mineral precipitating procedure S1, an electric current is applied between the coral-growth substrate for growing coral, which is placed in seawater, and the first anode electrically connected to the coral-growth substrate and placed in the seawater, thereby precipitating electrodeposited minerals such as $CaCO_3$, $Mg(OH)_2$, and $MgCO_3$ on the coral-growth substrate, which functions as a cathode. Because calcareous algae easily settle in the electrodeposited minerals, the electrodeposited minerals are precipitated on the coral-growth substrate, thereby facilitating coral growth and development. The electrodeposited minerals are precipitated on the coral-growth substrate before the growth of the coral larvae, so that coral can be reliably grown and cultivated more quickly than a case that coral is grown and cultivated while precipitating the electrodeposited minerals on the coral-growth substrate.

Figure 2:
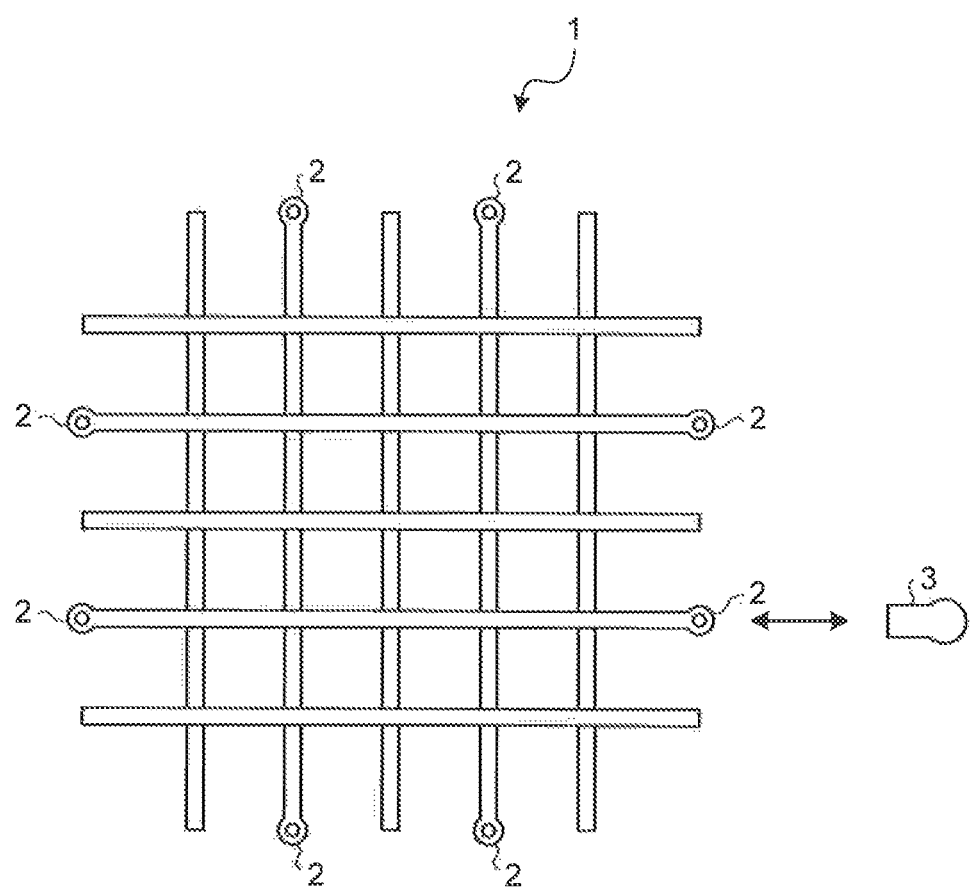
FIG. 2 is a plan view of a coral-growth substrate according to the embodiment.

FIG. 2 is a plan, view of the coral-growth substrate according to the present embodiment. A coral-growth substrate 1 is one of parts constituting the coral cultivation structure, and a plurality of coral-growth substrates 1 are combined to constitute the coral cultivation structure and used for growing coral. The coral-growth substrate 1 is formed in a net-like fashion by welding a plurality of rod-like members or by using a mesh, and includes an attaching part 2, which is a part connected to the coral cultivation structure or another coral-growth substrate 1, at the time of configuring the coral cultivation structure.

As shown in FIG. 2, the attaching part 2 can be provided at the end of the coral-growth substrate 1 or at the center thereof. For example, a bolt hole is punched in the attaching part 2, to screw the attaching part 2 to a frame member of the coral cultivation structure. The attaching part 2 of the coral-growth substrate 1 is formed so that it can be electrically connected to the second anode described later. Therefore, for example, until the coral cultivation structure is configured, the attaching part 2 is covered with, for example, a detachable precipitation protective covering 3 so that an insulator such as the electrodeposited minerals does not adhere to the attaching part 2. At the time of configuring the coral cultivation structure, the insulator such as the electrodeposited minerals precipitated on the surface of the attaching part 2 can be removed.

The coral-growth substrate 1 is formed by a conductor. It is desired to use stainless steel, or a metal having high corrosion resistance such as titanium (Ti) or titanium compound for the coral-growth substrate 1, taking into consideration that the coral-growth substrate 1 is used in seawater. The surface of the coral-growth substrate 1 can be covered with, for example, ceramic powder or porous concrete to form a porous covering layer. Accordingly, the coral larvae (planula larvae) can be easily grown on the coral-growth substrate 1.

Figure 3:
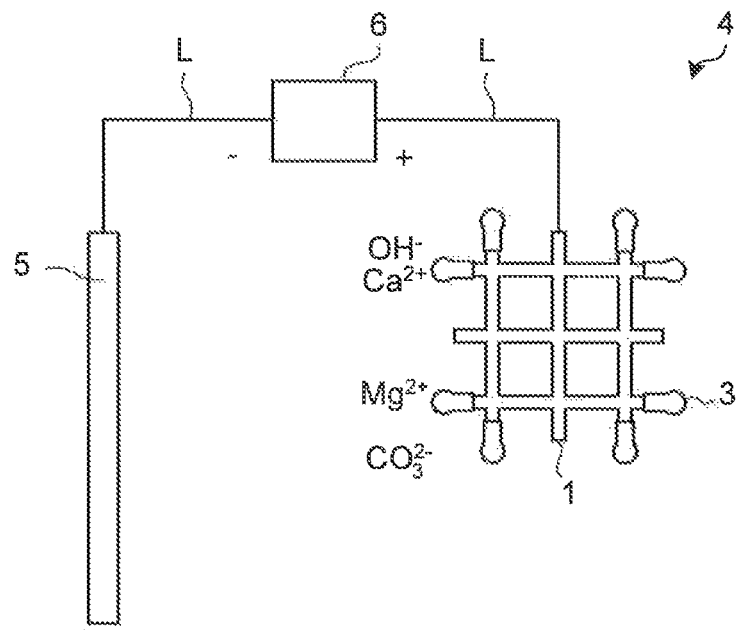
FIG. 3 is a schematic diagram of an electrodeposited-mineral precipitating device that performs an electrodeposited-mineral precipitating procedure according to the embodiment.

FIG. 3 is a schematic diagram of an electrodeposited-mineral precipitating device that performs the electrodeposited-mineral precipitating procedure according to the present embodiment. In the electrodeposited-mineral precipitating procedure S1 according to the present embodiment, the coral-growth substrate 1 and a first anode 5 are installed in seawater. A power source 6 is connected between the coral-growth substrate 1 and the first anode 5 via a conductor line L. According to this configuration, an electric current is applied between the coral-growth substrate 1 and the first anode 5. Accordingly, calcareous (electrodeposited minerals) is precipitated on the coral-growth substrate 1, which functions as a cathode.

Because the size of the coral-growth substrate 1 is smaller than the coral cultivation structure described later, the coral-growth substrate 1 can be easily handled, and thus the electrodeposited-mineral precipitating procedure S1 can be performed in a narrow space, as compared with a method of directly precipitating the electrodeposited minerals on the coral cultivation structure. Therefore, the electrodeposited-mineral precipitating procedure S1 can be performed in seawater, and can be also easily performed in a water tank or the like filled with seawater. Further, the electrodeposited-mineral precipitating procedure S1 can be performed by electrically connecting a plurality of coral-growth substrates 1 to one first anode 5 and one power source 6.

It is desired to use an insoluble conductive material (such as titanium, carbon, and platinum) for the first anode 5, which does not become oxidized even if it is used for electrolysis of seawater. However, the material is not limited thereto, and a metal that is oxidatively dissolved can be used. When a metal that is oxidatively dissolved is used, it can be avoided that chlorine is generated from the first anode 5 during execution of the electrodeposited-mineral precipitating procedure S1. When a metal that is oxidatively dissolved is used for the first anode 5, aluminum or aluminum alloy is preferable. If the first anode 5 is made of aluminum or aluminum alloy, it can be avoided that chlorine is generated from the first anode 5 during the electrodeposited-mineral precipitating procedure S1. At the same time, oxidative dissolution of the first anode 5 can be delayed as compared with a case that the first anode 5 is made of magnesium or magnesium alloy.

When the power source 6 is used, a constant current can be applied more easily as compared with a case that an electric current is applied according to a galvanic anode method. The power source 6 is used for direct-current electricity and has an electric current adjusting function, for example, by using a variable resistor in order to change the current density on the surface of the coral-growth substrate 1. The current density on the surface of the coral-growth substrate 1 can be easily changed by the electric current adjusting function, and precipitation rate of electrodeposited minerals can be changed.

The size of the current density can be appropriately set. However, it is desired to set the current density so that the current density on the surface of the coral-growth substrate 1 becomes larger than a value at the time of cultivating coral. Accordingly, the precipitation rate of electrodeposited minerals can be increased that that at the time of coral cultivation, thereby enabling to easily manufacture the coral-growth substrate 1 on which coral larvae are grown. It is desired that the current density on the surface of the coral-growth substrate 1 is larger than the current density suitable for coral cultivation (it will be described in detail in the explanations of the coral cultivating procedure described later), and it is preferable that the current density is, for example, equal to or larger than 1000 mA/m² and equal to or less than 5000 mA/m².

Figure 4:
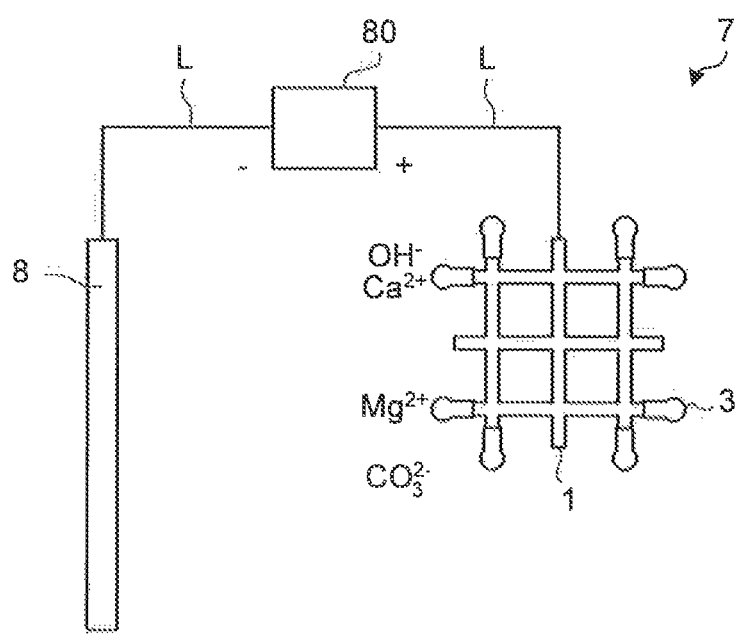
FIG. 4 is a schematic diagram of an electrodeposited-mineral precipitating device that performs an electro-deposited-mineral precipitating procedure according to another embodiment.

FIG. 4 is a schematic diagram of an electrodeposited-mineral precipitating device that performs an electrodeposited-mineral precipitating procedure according to another embodiment. In the electrodeposited-mineral precipitating procedure S1 according to the present embodiment, a first anode 8 is made of a material having a self-potential on a base side (its potential lower) than that of the coral-growth substrate 1 to form a galvanic anode, and an electric current is applied between the first anode 8 and the coral-growth substrate 1 according to a so-called galvanic anode method. When the galvanic anode method is used, if the potential of the coral-growth substrate 1 is on the base side (is lower) than −1100 millivolts (saturated calomel electrode standard, omitted, hereinafter), the reaction in the coral-growth substrate 1 is generally a hydrogen generation reaction expressed by an equation (1), and the size of the current density can be 1000 mA/m² or larger. The first anode 8 corresponding to the reaction is formed of magnesium or magnesium alloy (magnesium, series). With the above current value, precipitation of electrodeposited minerals is facilitated.

$$2H_2O + 2e^- \rightarrow H_2 + 2OH^- \quad (1)$$

To change the current density on the surface of the coral-growth substrate 1, a current-density changing unit 80 that changes the size of the electric current to change the current density can be connected between the coral-growth substrate 1 and the first anode 8 via the conductor line L to apply the electric current. For example, a variable resistor can be used as the current-density changing unit 80, or semiconductor elements can be combined to form the current-density changing unit 80, or the current-density changing unit 80 can be a replaceable resistance. The shape, material, number, arrangement and the like of the first anode 8 can be changed. Thus, by changing the current density, the precipitation rate of electrodeposited minerals can be controlled.

If the potential of the coral-growth substrate 1 is on a noble side (is higher) than −1100 millivolts, the reaction in the coral-growth substrate 1 is generally an oxygen reduction reaction expressed by an equation (2), and the size of the current density is about 100 mA/m².

$$O_2 + H_2O + 4e^- \rightarrow 4OH^- \quad (2)$$

The first anode 8 corresponding to the reaction is formed of aluminum or aluminum alloy (aluminum series). With the above current value, precipitation of electrodeposited minerals becomes slower than the case that the size of the current density is 1000 mA/m² or larger. Therefore, it is desired that a power source is connected between the coral-growth substrate 1 and the first anode 8 to apply an electric current so that the current density on the surface of the coral-growth substrate 1 becomes larger than about 100 mA/m², and first performs precipitation of electrodeposited minerals composed mainly of magnesium salt. The power source is then cut off and an electric current is applied according to the galvanic anode method to perform precipitation of electrodeposited minerals composed mainly of calcium salt, thereby enabling to precipitate electrodeposited minerals on the coral-growth substrate 1 efficiently. If the first anode 8 is made of an aluminum series material, the service life of the first anode 8 is extended, because consumption of the first anode is relatively small.

When an electric current is applied according to the galvanic anode method, the configuration of the coral-growth substrate 1 is the same as when an electric current is applied by using a power source, except that a material having a self-potential on the noble side (its potential higher) than that of the first anode 8 is used.

[Coral-Larvae Growing Procedure]

In the coral-larvae growing procedure S2, coral larvae (planula larvae) are grown on the coral-growth substrate precipitated with electrodeposited minerals in the electrodeposited-mineral precipitating procedure S1. The electrodeposited minerals become a basis of growth of the coral larvae. Therefore, if coral larvae are grown after precipitation of electrodeposited minerals on the coral-growth substrate, coral larvae can be easily grown on the coral-growth substrate. The coral-larvae growing procedure S2 is performed by bringing the coral-growth substrate into contact with seawater having high density of coral larvae.

Figure 5:
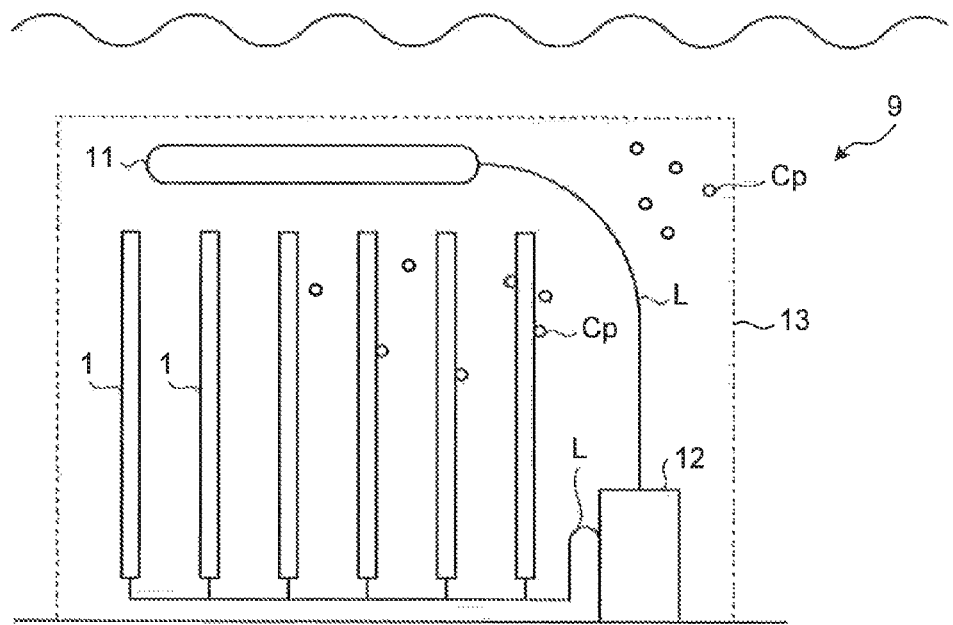
FIG. 5 is a schematic diagram of a coral-larvae growing device that performs a coral-larvae growing procedure according to the embodiment.

FIG. 5 is a schematic diagram of a coral-larvae growing device 9 that performs the coral-larvae growing procedure S2 according to the present embodiment. The coral-growth substrate 1 precipitated with electrodeposited minerals is held in seawater by a holding device (not shown) installed on an ocean bed. In FIG. 5, an embodiment in which the coral-growth substrate 1 is held substantially orthogonal to a direction of the ocean surface is shown. However, the holding posture can be changed according to an installation environment such as the situation of the ocean bed and the current in the ocean. For example, the coral-growth substrate 1 can be held in parallel with the ocean surface. The held coral-growth substrate 1 is surrounded by a diffusion preventing unit 13 such as a plankton net that can prevent diffusion of coral larvae Cp and coral eggs, and the coral larvae Cp is put inside of the diffusion preventing unit 13.

There is no limitation on a collecting method of coral larvae to be grown. For example, coral larvae are collected according to the following manner. That is, a collecting container with a wide opening is put over a coral colony in the ocean in a coral spawning season. When a bundle in which coral eggs and sperms are integrated after coral spawning is released, the bundle drifts upward in the ocean and gathers in the collecting container, thereby collecting the bundle. Because the bundle is split open and a slick, which is an aggregate of fertilized eggs, floats on the ocean surface after the following day of the coral spawning day, the slicks are collected. When the collected bundles and slicks are cultured under appropriate conditions in seawater, these develop to be coral larvae (planula larvae). The coral larvae Cp after the bundles and slicks are cultured are released to the inside of the diffusion preventing unit 13. The density of coral larvae then increases inside the diffusion preventing unit 13 than in outside seawater, and as a result, more coral larvae Cp are easily grown on the coral-growth substrate 1. The coral larvae Cp can be released in the diffusion preventing unit 13, and the bundles and slicks can be directly put therein before culturing. In this case, coral eggs hatch inside the diffusion preventing unit 13 to become the coral larvae Cp, which are grown on the coral-growth substrate 1.

Because the coral-growth substrate 1 is smaller than the coral cultivation structure, a plurality of coral-growth substrates 1 can be thickened and arranged in the diffusion preventing unit 13. As a result, the density of the coral larvae Cp in the diffusion preventing unit 13 can be increased than a case that coral larvae are grown by directly enclosing the coral cultivation structure by the diffusion preventing unit 13. Therefore, the coral larvae Cp can be grown efficiently.

In the present embodiment, the coral-larvae growing device 9 grows coral larvae on the coral-growth substrate 1, and thereafter cultivating the grown coral larvae. In the coral-larvae growing procedure S2, it is not essential to apply an electric current between a coral growing anode 11 and the coral-growth substrate 1. In this case, the coral growing anode 11 is not required. In the present embodiment; however, an electric current is applied between the coral growing anode 11 and the coral-growth substrate 1 in the coral-larvae growing procedure S2. In an electric field environment with appropriate current density, it is predicted that the activity of coral, larvae increases. Therefore, if an electric current is applied in a process of growing coral larvae, coral larvae can be easily grown on the coral-growth substrate 1, and the growth of the grown coral larvae can be also promoted.

Because an electric current is applied between the coral growing anode 11 and the coral-growth substrate 1 in the coral-larvae growing procedure S2, the coral-larvae growing device 9 includes the coral growing anode 11. As the coral growing anode 11, an anode that can be used in the electrodeposited-mineral precipitating procedure S1 can be used. As a method of applying an electric current between the coral-growth substrate 1 and the coral growing anode 11, a method of connecting a power source 12 to between the coral growing anode 11 and the coral-growth substrate 1 via the conductor line L to apply an electric current, and a method of forming the coral growing anode 11 by a material having a self-potential lower than that of the coral-growth substrate 1 and applying an electric current according to the galvanic anode method can be mentioned.

In any methods mentioned above, it is desired to set the current density on the surface of the coral-growth substrate 1 to a value appropriate for coral cultivation (which will be described in detail in the explanations of the coral cultivating procedure). With such a value, the development of the coral larvae Cp already grown on the coral-growth substrate 1 can be promoted while growing the coral larvae. It is desired that the current density on the surface of the coral-growth substrate 1 is equal to or larger than 10 mA/m$^2$ and equal to or less than 500 mA/m$^2$, preferably, from equal to or larger than 30 mA/m$^2$ and equal to or less than 300 mA/m$^2$, more preferably, equal to or larger than 40 mA/m$^2$ and equal to or less than 100 mA/m$^2$, and still more preferably, equal to or larger than 40 mA/m$^2$ and equal to or less than 70 mA/m$^2$. With such current density, electrodeposited minerals are appropriately precipitated to promote the coral growth and development. Further, alkalization of the surrounding environment of the coral-growth substrate 1 is promoted (that is, pH of seawater around the coral-growth substrate 1 increases). It is considered that when alkalization is promoted in this manner, energy required for coral calcification decreases, to improve the coral growth rate.

As the method of changing the current density, the same method as that used in the electrodeposited-mineral precipitating procedure S1 can be used, and for example, a method of applying an electric current by using a power source having a current adjusting function such as a variable resistor, a method of connecting a variable resistor and a corresponding semiconductor element or the like to between the coral growing anode 11 and the coral-growth substrate 1, and a method of changing the shape, size, material, number, arrangement and the like of the coral growing anode 11 can be mentioned.

The coral-larvae growing procedure S2 can be performed by installing the coral-larvae growing device 9 in the ocean or can be performed in a water tank. In this case, the water tank functions as the diffusion preventing unit. Further, a coral-larvae growing device that does not include the diffusion preventing unit can be installed in an ocean area where the density of the coral larvae Cp is high (for example, above a coral colony after the spawning day, and current rip where slicks are floating), and the coral larvae Cp can be grown on the coral-growth substrate 1 without using the diffusion preventing unit. Because the coral-growth substrate 1 is smaller than the coral cultivation structure, it can be easily moved to the ocean area where the density of the coral larvae Cp is high.

[Coral-Cultivation-Structure Configuring Procedure]

In the coral-cultivation-structure configuring procedure S3, the coral cultivation structure is configured by a plurality of coral-growth substrates, on which coral larvae are grown. The coral cultivation structure is configured by combining the coral-growth substrates. The coral cultivation structure includes a coral growing portion, on which coral is grown, and the second anode, and is configured so that an electric current can be applied between the coral growing portion and the second anode.

Figure 6:
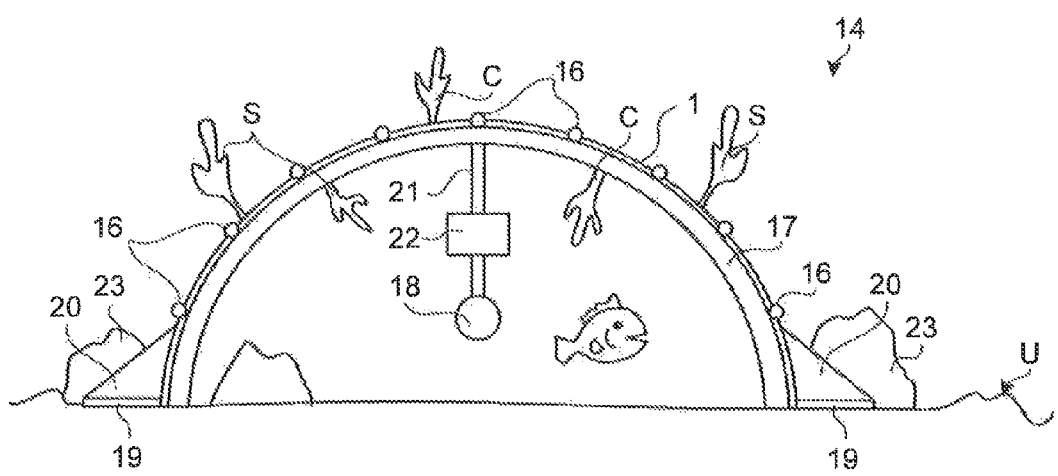
FIG. 6 is a front view of a configuration example of a coral cultivation structure in a procedure for configuring a coral cultivation structure according to the embodiment.
Figure 7:
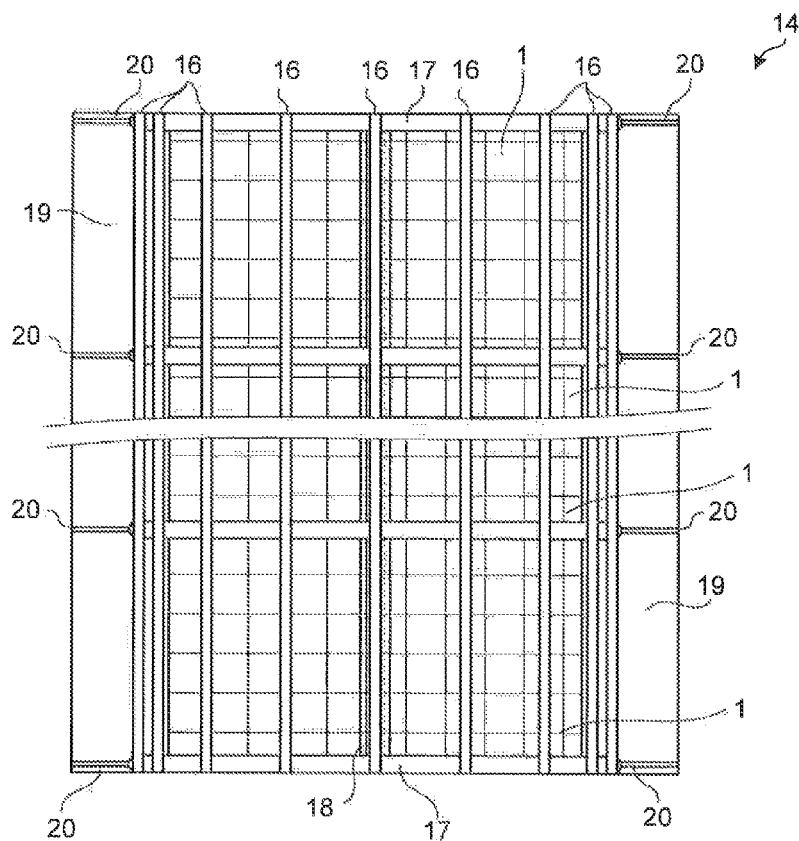
FIG. 7 is a plan view of a configuration example of the coral cultivation structure according to the embodiment.
Figure 8:
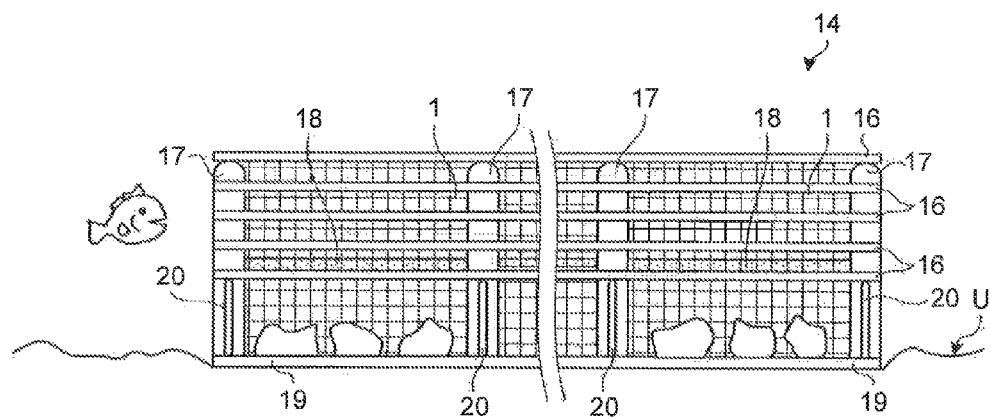
FIG. 8 is a side view of a configuration example of the coral cultivation structure according to the embodiment.

FIG. 6 is a front view of a configuration example of the coral cultivation structure in the procedure for configuring the coral cultivation structure according to the present embodiment. FIG. 7 is a plan view of a configuration example of the coral cultivation structure according to the present embodiment. FIG. 8 is a side view of a configuration example of the coral cultivation structure according to the present embodiment. In a coral cultivation structure 14 according to the present embodiment, coral C grown on the coral-growth substrate 1 in the coral-larvae growing procedure S2 or the coral C naturally grown on a frame of the coral cultivation structure 14 is cultivated. The coral cultivation structure 14 promotes the coral growth using the galvanic anode method, and the coral-growth substrate 1 functions as a cathode with respect to a second anode 18 (a galvanic anode).

The frame of the coral cultivation structure 14 is formed by combining a rod-like first frame member 16 and a circular-arc second frame member 17. The coral cultivation structure 14 is formed by attaching the coral-growth substrate 1 and the second anode 18 to the frame. In the coral cultivation structure 14, the coral-growth substrate 1 is used as a cathode with respect to the second anode 18, and the frame formed by the first frame member 16 and the second frame member 17 is also used as a cathode with respect to the second anode 18. That is, coral also grows on the frame. Accordingly, it is desired that the first frame member 16 and the second frame member 17 are manufactured from the same material as that of the coral-growth substrate 1. For example, these frame members are formed of stainless steel or steel.

Bottom members 19 are respectively attached to opposite ends of the circular-arc second frame member 17. The second frame member 17 and the bottom member 19 are connected by a connecting plate 20 as a reinforcing member to improve the strength of an attaching part of the second frame member 17. The bottom member 19 is provided on the bottom of the coral cultivation structure 14, and for example, a plate-like member, a punching metal, a metal plate having a hole, a metal mesh or the like can be used as the bottom 19. The net-like coral-growth substrate 1 is arranged between the adjacent second frame members 17. The precipitation protective covering 3 or electrodeposited minerals are removed from the attaching part 2 of the coral-growth substrate 1 to expose the surface of the attaching part 2, which is a conductive material. Thereafter, the attaching part 2 of the coral-growth substrate 1 is fixed to the first frame member 16 and the second frame member 17 by a bolt, a wire or the like made of a conductive material, so that the coral-growth substrate 1 is electrically connected to the second anode 18. The second anode 18 is fixed to the second frame member 17 via a second-anode support member 21 that supports the second anode 18 on the coral cultivation structure 14. The first frame member 16, the second frame member 17, and the coral-growth substrate 1 become a cathode, respectively, in the galvanic anode method.

The second-anode support member 21 is formed of an electric conductor, and electrically connects the second anode 18 with the coral-growth substrate 1, the first frame member 16, and the second frame member 17, which are cathodes with respect to the second anode 18. A current-density changing unit 22 is attached to the second-anode support member 21. The current-density changing unit 22 can change the current density of the electric current flowing between the second anode 18 and the coral-growth substrate 1 and the like, which are the cathodes with respect to the second anode 18, and can simultaneously change the current density on the surface of the coral-growth substrate 1. The same unit used in the electrodeposited-mineral precipitating procedure S1 and the coral-larvae growing procedure S2 can be used as the current-density changing unit 22. However, when the current density does not need to be changed, the current-density changing unit 22 does not need to be provided.

At the time of setting the coral cultivation structure 14 on an ocean bed U, for example, an artificial live rock 23 is placed on the bottom member 19, so that it becomes an anchor of the coral cultivation structure 14. The mass of the coral cultivation structure 14 is small because a concrete structure is not included. Therefore, it is desired to stabilize the coral cultivation structure 14 by the live rock 23. Coral can be grown also on the live rock 23.

A configuration of the coral cultivation structure 14 that applies an electric current between the coral-growth substrate 1 and the second anode 18 by the galvanic anode method has been described above. However, the coral cultivation structure can have a configuration of connecting the power source between the coral-growth substrate 1 and the second anode to apply an electric current by the power source. In this case, the power source can be provided between the second anode 18 and the coral-growth substrate 1, for example, on the second-anode support member 21. When the power source has a current adjusting function, the power source also functions as the current-density changing unit 22. When the coral cultivation structure applies an electric current by the power source, the second anode does not need to be formed of a material having a self-potential lower than that of the coral-growth substrate 1. Further, the coral-cultivation-structure configuring procedure does not need to be necessarily performed. In this case, the coral-growth substrate 1 on which coral larvae are grown and the second anode 18 are arranged in the ocean, and an electric current is applied between the coral-growth substrate 1 and the second anode 18 to cultivate coral. The second, anode is explained in detail in the following coral cultivating procedure.

[Coral Cultivating Procedure]

In the coral cultivating procedure S4, an electric current is applied between the coral-growth substrate on which the coral larvae are grown, and the second anode to cultivate coral. In seawater, when an electric current is applied between the coral-growth substrate and the second anode, the same reaction as that shown by the equation (1) or the equation (2) explained in the electrodeposited-mineral precipitating procedure S1 occurs in the coral-growth substrate, and alkalization of the surrounding environment of the coral-growth substrate is promoted by generated hydroxide ions. It is considered that when alkalization is promoted, the energy required for coral calcification decreases, thereby improving the coral growth rate. Accordingly, the rate of survival and development of the grown coral larvae increases, and coral can be efficiently cultivated. Because the coral-growth substrate on which coral larvae are grown in advance is used, coral can be reliably cultivated faster than a case that coral is cultivated without growing the coral larvae.

Figure 9:
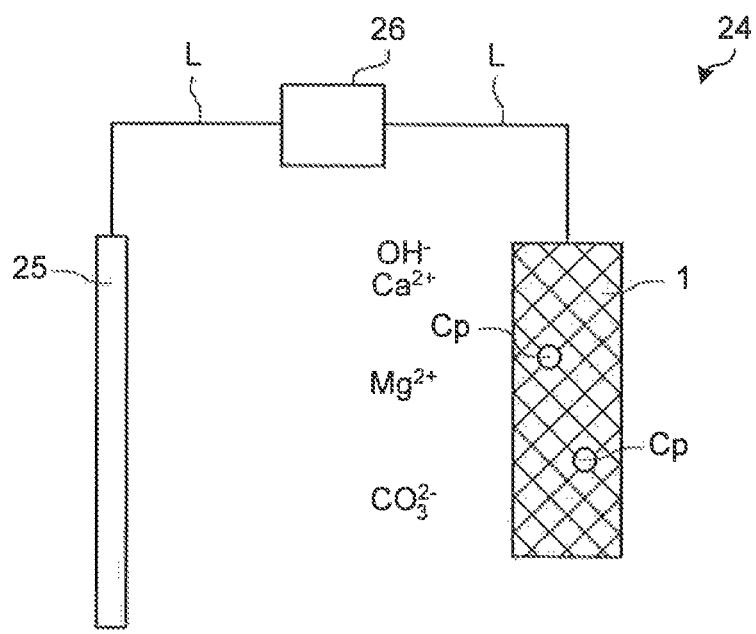
FIG. 9 is a schematic diagram of a coral cultivation device that performs a coral cultivating procedure by a galvanic anode method according to the embodiment.

FIG. 9 is a schematic diagram of a coral cultivation device that performs the coral cultivating procedure by the galvanic anode method according to the present embodiment. In a coral cultivation device 24, a second anode 25 is made of a material having a self-potential lower than that of the coral-growth substrate 1. The second anode 25 and the coral-growth substrate 1 on which the coral larvae Cp are grown are connected to each other via the conductor line L. A current-density changing unit 26 that can change the current density on the surface of the coral-growth substrate 1 is connected between the second anode 25 and the coral-growth substrate 1. When the second anode 25 and the coral-growth substrate 1 are installed in seawater, the second anode 25 becomes a galvanic anode, and electric current flows between the second anode 25 and the coral-growth substrate 1.

It is desired that the current density on the surface of the coral-growth substrate 1 has a value suitable for coral cultivation. When the current density is set to such a value, coral growth is promoted. The current density value suitable for coral cultivation on the surface of the coral-growth substrate 1 can be set as described below. The current density value suitable for coral cultivation can be applied regardless of the method of applying an electric current by the power source or the method of applying an electric current by the galvanic anode method. Further, the current density value suitable for coral cultivation is referred to as a value of current density suitable for coral cultivation described in the electrodeposited-mineral precipitating procedure S1 and the coral-larvae growing procedure S2.

Figure 10A:
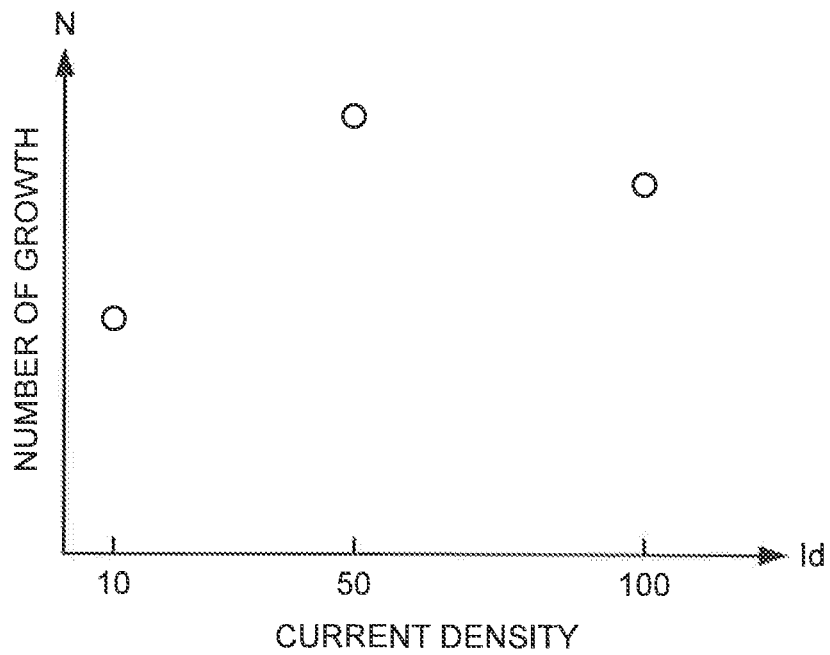
FIG. 10A depicts a relation between a size of current density and the number of grown coral, which was born by sexual reproduction.
Figure 10B:
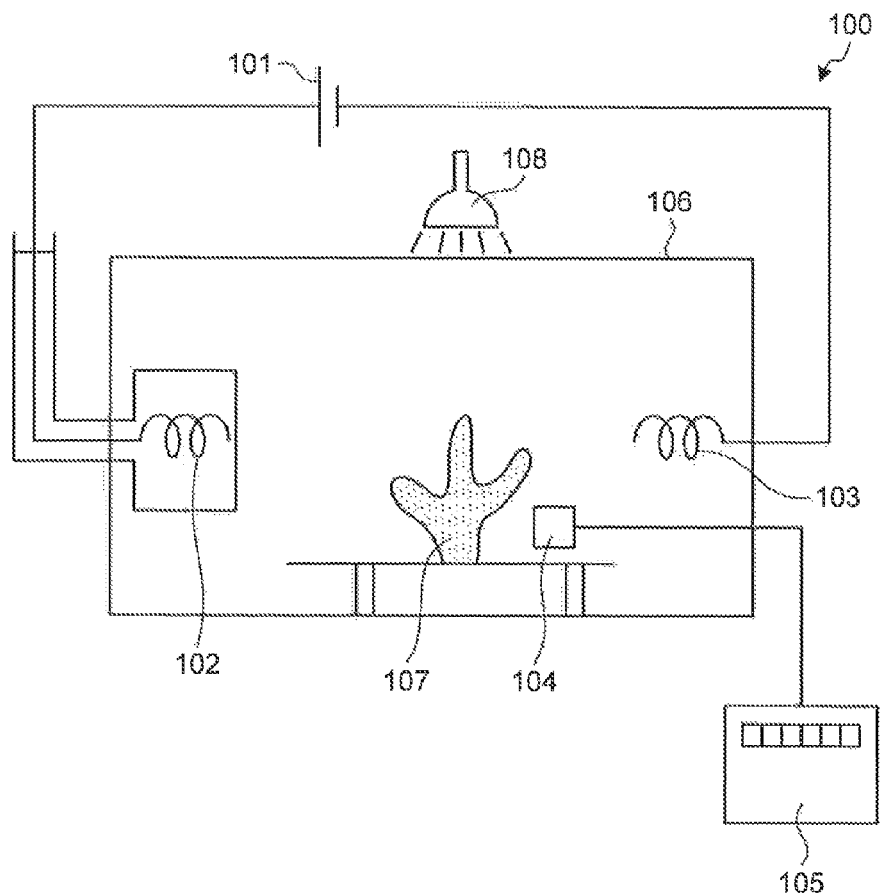
FIG. 10B depicts an experiment device for checking a photosynthetic activity of coral.
Figure 10C:
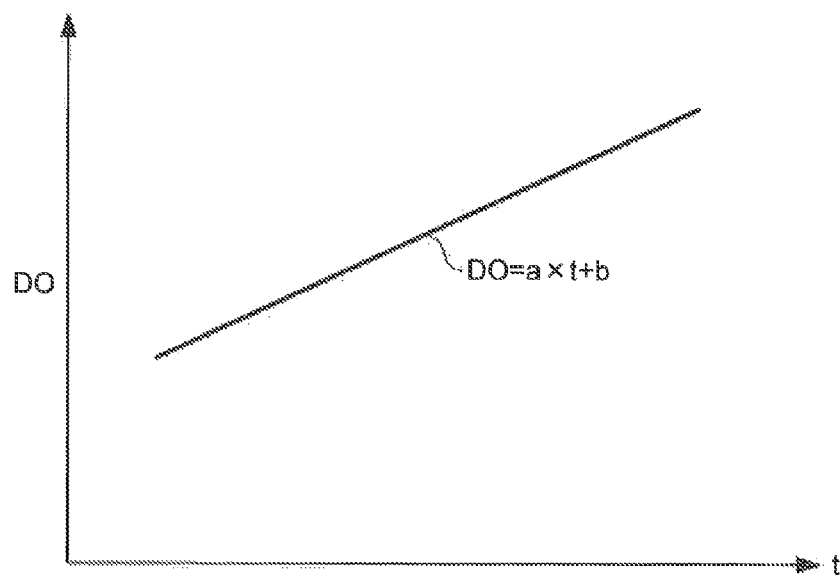
FIG. 10C depicts a relation between density of dissolved oxygen and current density acquired by experiments for checking the photosynthetic activity of coral.

FIG. 10A depicts a relation between the size of current density and the number of grown coral, which was born by sexual reproduction. FIG. 10B depicts an experiment device for checking a photosynthetic activity of coral. FIG. 10C depicts a relation between density of dissolved oxygen and current density acquired by experiments for checking the photosynthetic activity of coral. FIG. 10A depicts a relation between the number (number of growth) N of coral grown on the cathode, that, is, the coral-growth substrate 1 and current density Id ($mA/m^2$) of an electric current on the surface of the coral-growth substrate 1 as a cathode, in a sexual reproduction experiment of coral. When coral is grown and developed on the coral-growth substrate 1 as a cathode, current density on the surface of the coral-growth substrate 1 and current density of an electric current flowing between the coral-growth substrate 1 as a cathode and the second anode 25 become substantially the same. Accordingly, when coral is grown and developed on the coral-growth substrate 1 as a cathode, any of the current density (an electric field) of an electric current flowing between the second anode 25 and the coral-growth substrate 1, and the current density on the surface of the coral-growth substrate 1 can be used.

FIG. 10A depicts a result of monitoring of the number of coral born by the sexual reproduction and growing and developing (remaining) on the coral-growth substrate 1 by changing an electric current flowing to the cathode of the coral cultivation device 24 shown in FIG. 9, that is, the coral-growth substrate 1, seven weeks later after the growth thereof. When the current density on the surface of the coral-growth, substrate 1 is 50 mA/m$^2$, the number of survival of growing coral becomes the largest. Further, growth of coral is frequently observed in a floating dock provided with galvanic protection, in a portion having the current density of about 50 mA/m$^2$ (for example, the bottom part of the floating dock and near an oscillation control member), and it is also observed that the coral development is excellent. From these results, it is considered that when the current density on the surface of the coral-growth substrate 1 is about 50 mA/m$^2$, it is effective for the coral growth and development.

An influence of the electric field in the photosynthetic activity of coral was checked by an experiment device 100 shown in FIG. 10B. The configuration of the experiment device 100 is explained first. The experiment device 100 includes a testing container 106, an anode 102 as an electrode, a cathode 103, an oximeter including a detector 104 and a display unit 105, an illumination 108, and a power source 101.

The testing container 106 is made of a transparent material such as acrylic resin or glass. The anode 102 and the cathode 103 are arranged on opposite ends of the testing container 106, and seawater is filled in the testing container 106. Coral 107 is provided between the anode 102 and the cathode 103. The detector 104 of the oximeter is arranged near the coral 107.

The oximeter measures the level of oxygen dissolved in seawater in a portion where the coral 107 is arranged in the testing container 106. The oxygen level in seawater detected by the detector 104 of the oximeter is displayed on the display unit 105. Because the dissolved oxygen level in seawater in the testing container 106 has high correlation with the photosynthetic activity of the coral 107, the photosynthetic activity of the coral 107 is evaluated based on the dissolved oxygen level in seawater in the testing container 106.

When the photosynthetic activity of the coral 107 is to be evaluated by the experiment device 100, an electric field is formed in seawater present in the testing container 106 by using the power source 101, and light is irradiated to the coral 107 by the illumination 108. Under such an environment, the dissolved level of oxygen in seawater present in the testing container 106 is measured by the oximeter, to evaluate the photosynthetic activity of the coral 107.

The result of evaluation of the photosynthetic activity of the coral by the experiment device 100 shown in FIG. 10B is shown in FIG. 10C. The coral 107 under evaluation is *Acropora Formosa*. FIG. 10C depicts a change in the dissolved oxygen level DO (mg/l) with respect to a time t. When light is irradiated to the coral 107 by the illumination 108 of the experiment device 100, the dissolved oxygen level DO in seawater in the testing container 106 monotonously increase with passage of the time t. The change in the dissolved oxygen level DO can be approximated by a linear function a×t+b, where a and b are a constant, respectively. The constant "a" denotes a rate of time change in the dissolved oxygen level DO, and it is shown that as the value of the constant "a" increases, the photosynthetic activity of the coral 107 becomes more active.

The dissolved oxygen level DO in seawater present in the testing container 106 was measured for a predetermined time by irradiating light to the coral 107 by the illumination 108 and changing the current density of an electric current flowing between the anode 102 and the cathode 103 to three stages of 0 mA/m$^2$, 50 mA/m$^2$, and 100 mA/m$^2$. The irradiation condition of light is 300 mol/(m$^2$·sec.). When the current density is 0 mA/m$^2$, the constant "a" is 8.82 mgO$_2$/(L/day). When the current density is 50 mA/m$^2$, the constant "a" is 18.87 mgO$_2$/(L/day). When the current density is 100 mA/m$^2$, the constant "a" is 18.20 mgO$_2$/(L/day). The current density on the surface of the anode 102 can be considered to be substantially the same as that of an electric current flowing between the anode 102 and the cathode 103. Thus, when the current density on the surface of the anode 102 is 50 mA/m$^2$, the photosynthetic activity of the coral 107 becomes the highest.

From the monitoring result of coral growth and the evaluation result of the photosynthetic activity of coral, described above, it is considered that when the current density of an electric current flowing between the anode 102 and the cathode 103, that is, the current density on the surface of the coral-growth substrate as the cathode is about 50 mA/m$^2$ (preferably, 50 mA/m$^2$), it is effective for the coral growth and development. The current density has a certain range around 50 mA/m$^2$ according to the kind of coral and conditions of the ocean area. For example, to promote the coral growth, it is considered that the current density is equal to or larger than 10 mA/m$^2$ and equal to or less than 500 mA/m$^2$, preferably, equal to or larger than 30 mA/m$^2$ and equal to or less than 300 mA/m$^2$, more preferably, equal to or larger than 40 mA/m$^2$ and equal to or less than 100 mA/m$^2$, and still more preferably, equal to or larger than 40 mA/m$^2$ and equal to or less than 70 mA/m$^2$. The current density in this range is suitable when coral is grown and developed on the coral-growth substrate, that is, suitable for coral cultivation.

To promote the coral growth, it is desired that the current density on the surface of the coral-growth substrate 1 equals to or is higher than 10 mA/m$^2$. However, if the current density exceeds 500 mA/m$^2$, an electrodeposition rate of calcareous becomes faster than the coral growth rate, and the coral growth may be hindered. Therefore, it is desired to cultivate coral by setting the current density on the surface of the coral-growth substrate 1 to equal to or less than 500 mA/m$^2$.

When coral growth is promoted, a material and arrangement of the second anode 25 that can realize the current density described above are selected. Further, it is desired that the materials of the second anode 25 and the coral-growth, substrate 1 are selected according to hydrographic conditions such as flow rate and salt level in the ocean area where coral is cultivated, to adjust the current density on the surface of the coral-growth substrate 1, so that the circumference of the coral-growth substrate 1 is set to the most suitable environment for coral cultivation according to the hydrographic conditions. To realize the current density described above, the cathode potential needs to be around −1050 millivolts.

The second anode 25 is preferably made of aluminum or aluminum alloy. By forming the second anode 25 by aluminum or aluminum alloy, the current density on the surface of the coral-growth substrate 1 can be easily set to a value suitable for coral cultivation.

To change the current density, the current-density changing unit 26 can be connected. For example, the current-density changing unit 26 is a variable resistor, detachable resistance, or corresponding semiconductor element.

An electric current can be applied between the second anode and the coral-growth substrate 1 not only by the galvanic anode method but also by connecting a power source to between the second anode and the coral-growth substrate 1 via the conductor line L. By connecting the current-density changing unit 26 as well as the power source, the current density on the surface of the coral-growth substrate 1 can be adjusted. The same unit used at the time of applying an electric current by the galvanic anode method can be used as the current-density changing unit 26. When the power source has the current adjusting function, the power source also functions as the current-density changing unit 26.

When an electric current is applied by the power source, a metal that is oxidatively dissolved can be used as the second anode, as well as an insoluble conductive material (such as titanium, carbon, and platinum), which does not become oxidized even if it is used for electrolysis of seawater. When the metal that is oxidatively dissolved is used, it can be avoided that chlorine is generated from the second anode during the coral cultivating procedure S4. Aluminum or aluminum alloy is preferably used as the second anode. When the second anode is made of aluminum or aluminum alloy, it can be avoided that chlorine is generated from the second anode during the coral cultivating procedure S4. At the same time, oxidative dissolution of the second anode can be delayed, as compared with a case that the second anode is made of magnesium or magnesium alloy, although magnesium or magnesium alloy can be used as the second anode.

The first anode used in the electrodeposited-mineral precipitating procedure S1 can be directly used as the second anode, when an electric current is applied by the galvanic anode method or when an electric current is applied by the power source. With this arrangement, it becomes convenient because the first anode can be directly used as the second anode without any replacement.

In the present embodiment, the coral cultivating procedure S4 is performed following the coral-cultivation-structure configuring procedure S3, with respect to the coral-growth substrate on which coral larvae are grown. However, the coral cultivating procedure can be performed before the coral-cultivation-structure configuring procedure to grow coral larvae to some extent on the coral-growth substrate, and then the coral-cultivation-structure configuring procedure can be performed, and thereafter the coral cultivating procedure can be performed again.

[Example in which Coral-Growth Substrate is Manufactured]

Figure 11A:
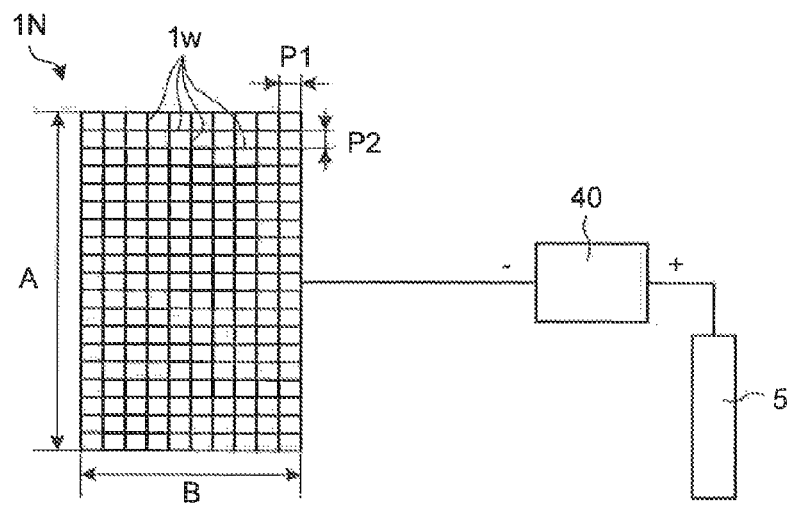
FIG. 11A is a conceptual diagram of an example in which a coral-growth substrate is manufactured by a manufacturing method for a coral-growth substrate precipitated with electrodeposited minerals according to the present embodiment.
Figure 11B:
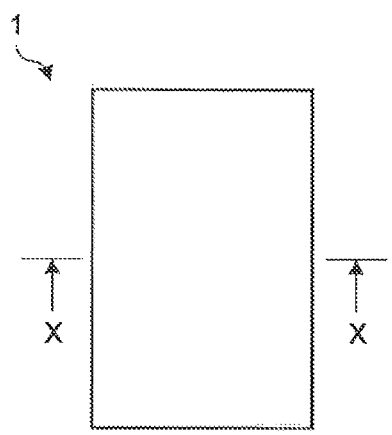
FIG. 11B depicts a configuration of a coral-growth substrate manufactured by the manufacturing method for a coral-growth substrate precipitated with electrodeposited minerals according to the present embodiment.
Figure 11C:
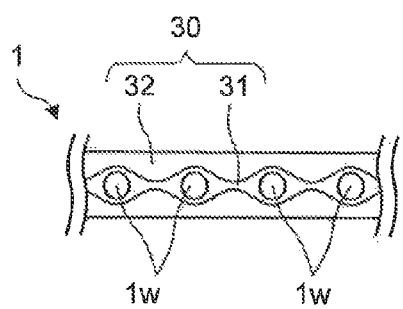
FIG. 11C is a sectional view along a line X-X in FIG. 11B.
Figure 12:
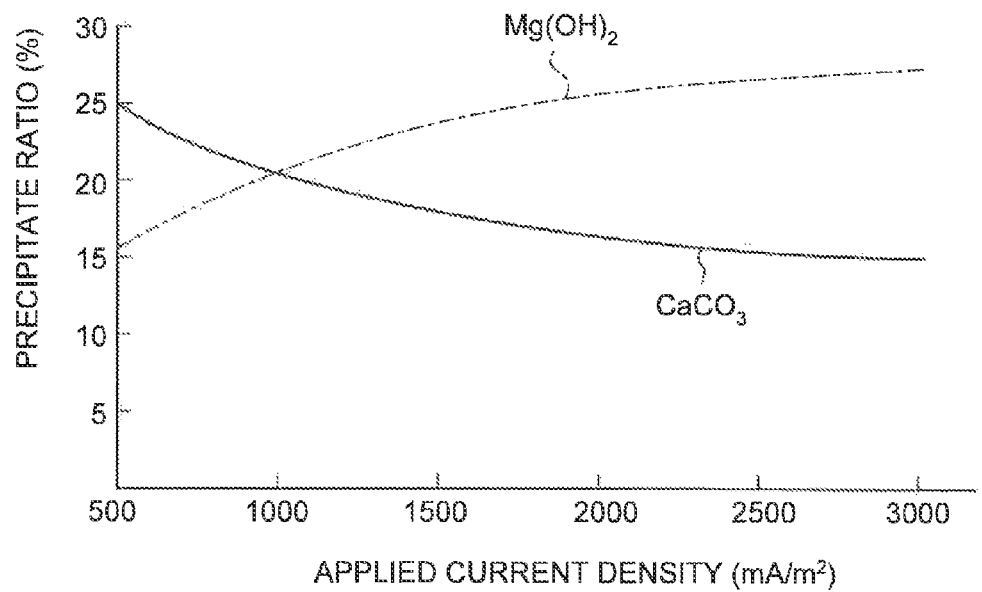
FIG. 12 is a schematic diagram of a relation, between a component ratio of electrodeposited minerals precipitated on a surface of a coral-growth substrate and applied current density.

FIG. 11A is a conceptual diagram of an example in which a coral-growth substrate is manufactured by a manufacturing method for a coral-growth substrate precipitated with electrodeposited minerals according to the present embodiment. FIG. 11B depicts a configuration of a coral-growth substrate manufactured by the manufacturing method for a coral-growth substrate precipitated with electrodeposited minerals according to the present embodiment. FIG. 11C is a sectional view along a line X-X in FIG. 11B. FIG. 12 is a schematic diagram of a relation between a component ratio of electrodeposited minerals precipitated on a surface of a coral-growth substrate and applied current density.

As shown in FIG. 11A, a coral-growth substrate frame 1N is connected to a negative terminal of a power source 40 and the first anode 5 is connected to a positive terminal of the power source 40, and the coral-growth substrate frame 1N and the first anode 5 are put in seawater and an electric current is applied between the coral-growth substrate frame 1N and the first anode 5. Accordingly, the electrodeposited minerals are precipitated on the surface of the coral-growth substrate frame 1N. The power source 40 has the current-density changing function for changing current density of an electric current flowing between the coral-growth substrate frame 1N and the first anode 5. In the present embodiment, the power source 40 is used; however, the electrodeposited minerals can be precipitated on the surface of the coral-growth substrate frame 1N by the galvanic anode method described above (this holds true in the following explanations).

As shown in FIG. 11A, the coral-growth substrate frame 1N is a net-like rectangular structure as viewed in a plan view, formed by weaving a wire 1w made of metal (for example, stainless steel or titanium), which is a metal core material, in a reticular pattern. It is assumed here that the longitudinal size of the coral-growth substrate frame 1N is A, and the lateral size thereof is B (A≥B). Lateral spacing P1 and longitudinal spacing P2 of the wire 1w are both 1 millimeter. The lateral spacing P1 and the longitudinal spacing P2 can be made different. The lateral spacing P1 and the longitudinal spacing P2 are not limited to 1 millimeter, and can be a size such that the space between the wires 1w can be filled with electrodeposited minerals, when electrodeposited minerals are precipitated on the wire 1w.

In the present embodiment, at the time of applying an electric current between the coral-growth substrate frame 1N and the first anode 5, an electric current is applied initially with a first current density Q1 (mA/m$^2$). After a predetermined time has passed, an electric current is applied between the coral-growth substrate frame 1N and the first anode 5 with a second current density Q2 (mA/m$^2$) smaller than the first current density Q1. In this manner, the current density between the coral-growth substrate 1 and the first anode 5 is adjusted at least by two stages. The adjustment is performed by the power source 40.

In the present embodiment, the coral-growth substrate frame 1N and the first anode 5 are arranged in seawater filled in the water tank to precipitate electrodeposited minerals with the first current density Q1 for three weeks, and then with the second current density Q2 for one week. Thereafter, the coral-growth substrate frame 1N and the first anode 5 are arranged in actual seawater to rest the coral-growth substrate frame 1N and the first anode 5 with a third current density Q3 for about nine weeks. In the present embodiment, it is assumed that the first current density Q1 is 3000 mA/m$^2$, the second current density Q2 is 1000 mA/m$^2$, and the third current density Q3 is 10 mA/m$^2$, or 50 mA/m$^2$, or 100 mA/m$^2$.

In the present embodiment, the reason why current density is changed at least by two stages at the time of manufacturing the coral-growth substrate 1 (see FIG. 11B) covered with electrodeposited minerals by precipitating the electrodeposited minerals on the surface of the wire 1w constituting the coral-growth substrate frame 1N is explained here. FIG. 12 depicts a component ratio of electrodeposited minerals precipitated on the surface of the coral-growth substrate frame 1N when the current density (applied current density) between the coral-growth substrate frame 1N and the first anode 5 is changed.

As shown in FIG. 12, when the applied current density is about 3000 mA/m$^2$, in the component ratio of the electrodeposited minerals, $Mg(OH)_2$ (magnesium hydroxide) is higher than $CaCO_3$ (calcium carbonate); however, as the applied current density decreases, the component ratio of $Mg(OH)_2$ decreases. The component ratio of the electrodeposited minerals is reversed when the applied current density is about 1000 mA/m$^2$, and $CaCO_3$ becomes higher than $Mg(OH)_2$ in the component ratio.

When the applied current density is low, in the electrodeposited minerals precipitated on the surface of the wire 1w constituting the coral-growth substrate frame 1N, $CaCO_3$ becomes higher than $Mg(OH)_2$ in the component ratio. Because $CaCO_3$ is a main component of the coral skeleton, it is considered that such electrodeposited minerals are preferable for a coral growth environment. However, when the applied current density is low, because a precipitation amount of electrodeposited minerals is small, a certain time is required for covering the surface of the wire 1w constituting the coral-growth substrate frame 1N with a sufficient amount of electrodeposited minerals.

On the other hand, when the applied current density is high, because more electrodeposited minerals are precipitated on the surface of the wire 1w constituting the coral-growth substrate frame 1N, the surface of the coral-growth substrate frame 1N can be covered with electrodeposited minerals in a relatively short time. When the applied current density is high, $Mg(OH)_2$ becomes higher than $CaCO_3$ in the component ratio of the precipitated electrodeposited minerals. However, because $Mg(OH)_2$ is relatively fragile, when the electrodeposited minerals that covers the surface of the coral-growth substrate frame 1N has a component ratio such that $Mg(OH)_2$ is higher $CaCO_3$, coral larvae grown in electrodeposited minerals on the completed coral-growth substrate 1 may drop.

Therefore, by precipitating electrodeposited minerals having a high strength after precipitation and a component ratio such that $CaCO_3$, which is the main component of a coral skeleton, is higher than $Mg(OH)_2$ in the component ratio, electrodeposited minerals that covers the wire 1w constituting the coral-growth substrate frame 1N is made strong. Accordingly, because the coral-growth substrate frame 1N is covered with electrodeposited minerals having a component similar to that of the coral skeleton, the coral larvae are firmly grown in the electrodeposited minerals. Further, because cracking, separation and the like of the electrodeposited minerals are suppressed, dropping of the coral larvae grown in the electrodeposited minerals is suppressed.

It is assumed here that the second current density Q2 has a value equal to or lower than a current density, at which $CaCO_3$ becomes higher than $Mg(OH)_2$ in the component ratio of the electrodeposited minerals. Accordingly, the component ratio of the electrodeposited minerals precipitated on the surface of the wire 1w constituting the coral-growth substrate 1 can be reliably set such that $CaCO_3$ is higher than $Mg(OH)_2$.

As shown in FIG. 11C, in the coral-growth substrate 1 manufactured according to this method, an electrodeposited mineral layer 30 is formed by at least two layers of a first electrodeposited mineral layer 31 that covers outside of the wire 1w, which is a core material, and a second electrodeposited mineral layer 32 that covers outside of the first electrodeposited mineral layer 31. Accordingly, the first electrodeposited mineral layer 31 in which $Mg(OH)_2$ is higher than $CaCO_3$ in the component ratio can be covered with the second electrodeposited mineral layer 32 in which $CaCO_3$ is higher than $Mg(OH)_2$ in the component ratio. Further, $CaCO_3$ can be precipitated in gaps in the first electrodeposited mineral layer 31, thereby enabling to make the first electrodeposited mineral layer 31 dense and strong. According to these actions, dropping of the coral larvae grown on the surface of the electrodeposited mineral layer 30, more specifically, on the surface of the second electrodeposited mineral layer 32 is suppressed.

EVALUATION EXAMPLE

Figure 13A:
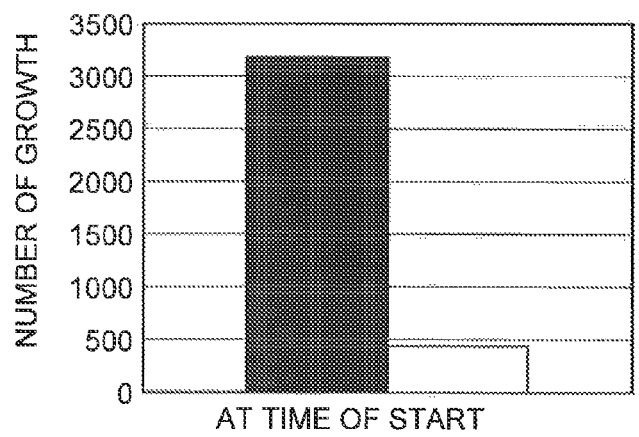
FIG. 13A depicts a result of evaluating the number of growth of coral larvae.
Figure 13B:
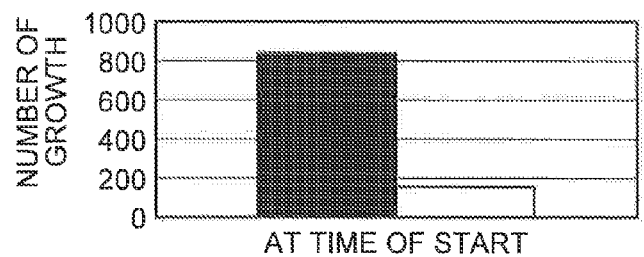
FIG. 13B depicts a result of evaluating the number of growth of coral larvae.
Figure 13C:
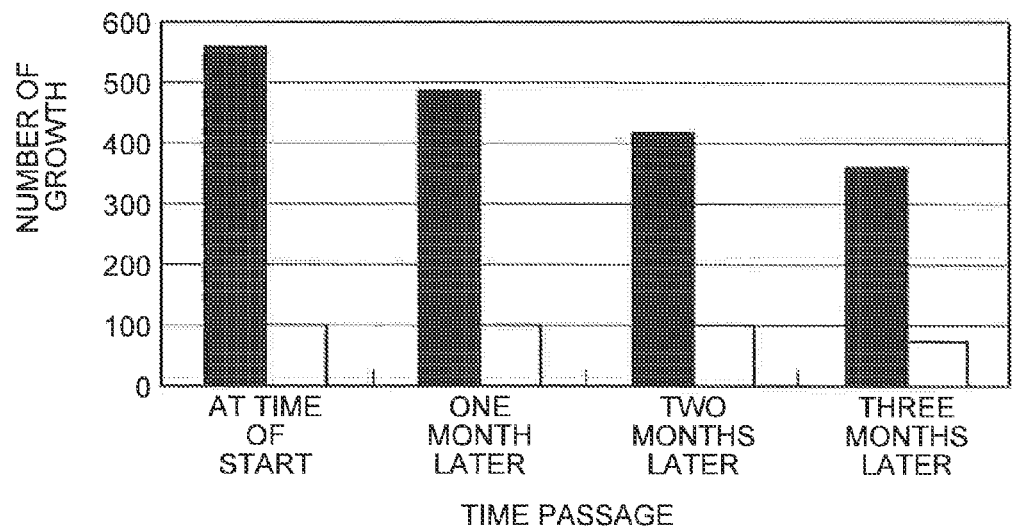
FIG. 13C depicts a result of evaluating the number of growth of coral larvae.
Figure 13D:
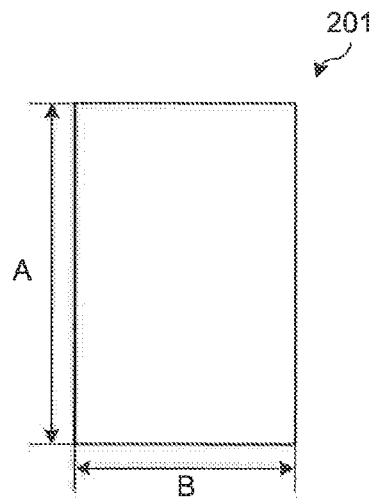
FIG. 13D depicts a coral-growth substrate that is formed by an unglazed tile and is used as a comparative example.

FIGS. 13A to 13C depict results of evaluating the number of growth of coral larvae. FIG. 13D depicts a coral-growth substrate that is formed by an unglazed tile and is used as a comparative example. A plurality of coral-growth substrates 1 manufactured according to the manufacturing method for a coral-growth substrate precipitated with electrodeposited minerals were set in seawater to grow coral larvae thereon. As a comparative example, a plurality of coral-growth substrates (unglazed tile substrates) 201 formed by the unglazed tile shown in FIG. 13D were set in seawater to grow coral larvae thereon. The longitudinal size of the unglazed tile substrate 201 is A, and the lateral size is B (A≥3), which is the same as the size of the coral-growth substrate 1 shown in FIG. 11A.

Black bars shown in FIGS. 13A to 13C are results obtained, by the coral-growth substrate 1 manufactured according to the manufacturing method for a coral-growth substrate precipitated with electrodeposited minerals described above, and white bars are results obtained by the unglazed tile substrate 201. The number of grown coral larvae (number of growth) is plotted on the vertical axis shown in FIGS. 13A to 13C. In FIG. 13A and FIG. 13B, ocean areas in which coral larvae are grown are different. FIG. 13C depicts a result of checking of a change in the number of growth, after coral larvae are grown, which was performed monthly and for three months.

As can be understood from FIGS. 13A to 13C, the number of growth of coral larvae on the coral-growth substrate 1 is four to six times larger than that on the unglazed tile substrate 201 at the time of start of evaluation. Further, as shown in FIG. 13C, the number of growth of the coral larvae after the growth of the coral larvae on the coral-growth substrate 1 is about four to five times larger than that on the unglazed tile substrate 201. In this manner, the coral-growth substrate 1 can grow more coral larvae, and can reliably settle the coral larvae after the growth, which is remarkably effective for artificial coral breeding.

INDUSTRIAL APPLICABILITY

As described above, the coral cultivation method according to the present invention is useful for efficient coral cultivation. Furthermore, the manufacturing method for a coral-growth substrate precipitated with electrodeposited minerals and the coral-growth substrate according to the present invention are useful for providing a coral-growth substrate that is useful for efficient coral cultivation.

REFERENCE SIGNS LIST 1 coral-growth substrate
1N coral-growth substrate frame
1w wire
2 attaching part
3 precipitation protective covering
4, 7 electrodeposited-mineral precipitating device
5, 8 first anode
6, 12, 40, 101 power source
9 coral-larvae growing device
11 coral growing anode
13 diffusion preventing unit
14 coral cultivation structure
18, 25 second anode
22, 26, 80 current-density changing unit
24 coral cultivation device
30 electrodeposited mineral layer
31 first electrodeposited mineral layer
32 second electrodeposited mineral layer
100 experiment device
102 anode
103 cathode
107, C coral
Cp coral larvae
L conductor line

The invention claimed is:

1. A coral cultivation method comprising:
placing a coral-growth substrate in seawater;
electrically connecting a first anode to the coral-growth substrate;
precipitating an electrodeposited-mineral on the coral-growth substrate by applying a first current density to the coral-growth substrate via the first anode;
growing a coral-larvae on the coral-growth substrate after precipitating the electrodeposited-mineral;
electrically connecting a second anode to the coral-growth substrate after growing; and
cultivating a coral by applying a second current density to the coral-growth substrate via the second anode, wherein
the first current density is greater than the second current density.

2. The coral cultivation method according to claim 1, wherein, after the growing of a coral-larvae, a coral-cultivation-structure configuring procedure for configuring a coral cultivation structure from a plurality of the coral-growth substrates on which the coral larvae are grown is performed, and thereafter the cultivating is performed.

3. The coral cultivation method according to claim 1, wherein an electrode having a self-potential lower than that of the coral-growth substrate is used as the first anode.

4. The coral cultivation method according to claim 1, wherein aluminum alloy or magnesium alloy is used as the first anode.

5. The coral cultivation method according to claim 1, wherein an electrode having a self-potential lower than that of the coral-growth substrate is used as the second anode.

6. The coral cultivation method according to claim 1, wherein aluminum alloy or magnesium alloy is used as the second anode.

7. The coral cultivation method according to claim 1, wherein the precipitating the electrodeposited-mineral includes applying the first current density by using a power source.

* * * * *